US012335574B2

(12) United States Patent
Bayat et al.

(10) Patent No.: US 12,335,574 B2
(45) Date of Patent: Jun. 17, 2025

(54) SYSTEMS AND METHODS FOR CUSTOMIZING LIVE VIDEO STREAMS

(71) Applicant: Shopify Inc., Ottawa (CA)

(72) Inventors: Samaneh Bayat, Kanata (CA); John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 263 days.

(21) Appl. No.: 17/231,184

(22) Filed: Apr. 15, 2021

(65) Prior Publication Data

US 2022/0337911 A1 Oct. 20, 2022

(51) Int. Cl.
| | |
|---|---|
| *H04N 21/478* | (2011.01) |
| *G06Q 30/0601* | (2023.01) |
| *H04N 21/2187* | (2011.01) |
| *H04N 21/431* | (2011.01) |
| *H04N 21/442* | (2011.01) |
| *H04N 21/81* | (2011.01) |

(52) U.S. Cl.
CPC ... *H04N 21/47815* (2013.01); *G06Q 30/0643* (2013.01); *H04N 21/2187* (2013.01); *H04N 21/4312* (2013.01); *H04N 21/44213* (2013.01); *H04N 21/8146* (2013.01)

(58) Field of Classification Search
CPC .......... H04N 21/812; H04N 21/47815; H04N 21/8146; H04N 21/2187; H04N 21/4312; H04N 21/44213; H04N 21/440245; H04N 21/25883; H04N 21/44016; H04N 21/25891; H04N 21/23412; G06Q 30/0643
See application file for complete search history.

(56) References Cited

U.S. PATENT DOCUMENTS

| | | | | |
|---|---|---|---|---|
| 9,799,061 | B2* | 10/2017 | Ivanov | G06Q 30/06 |
| 10,185,982 | B1* | 1/2019 | Kane-Parry | G06Q 30/0603 |
| 10,497,129 | B1* | 12/2019 | Cui | G06V 10/147 |
| 10,659,787 | B1* | 5/2020 | Brailovskiy | H04N 19/13 |
| 10,986,412 | B2* | 4/2021 | Andrews | H04N 21/812 |
| 11,140,434 | B1* | 10/2021 | Aher | H04N 21/472 |
| 2003/0110507 | A1 | 6/2003 | Dimitrova et al. | |
| 2007/0250901 | A1* | 10/2007 | McIntire | G11B 27/34 |
| | | | | 348/E7.071 |
| 2012/0084811 | A1* | 4/2012 | Thompson | H04N 21/812 |
| | | | | 725/34 |
| 2013/0174195 | A1 | 7/2013 | Witenstein-Weaver | |
| 2014/0244429 | A1* | 8/2014 | Clayton | G06Q 30/0631 |
| | | | | 705/26.7 |

(Continued)

OTHER PUBLICATIONS

US Office Action dated Aug. 15, 2023, U.S. Appl. No. 17/704,523.
US Office Action dated Apr. 11, 2024; U.S. Appl. No. 17/704,523.

*Primary Examiner* — Ngoc K Vu
(74) *Attorney, Agent, or Firm* — Rowand LLP

(57) ABSTRACT

A computer-implemented method is disclosed. The method includes: receiving video data for a live video stream; identifying a product that is displayed in a video frame of the live video stream; obtaining identifying information for a viewer of the live video stream; determining a product variant preference for the viewer; obtaining a graphical representation of the product variant; and providing modified video data of the live video stream based on presenting the graphical representation of the product variant as overlay content for the live video stream. Related apparatuses and computer-readable media are also disclosed.

20 Claims, 7 Drawing Sheets

(56) References Cited

U.S. PATENT DOCUMENTS

| | | | |
|---|---|---|---|
| 2017/0180435 A1* | 6/2017 | Edwards | H04L 65/61 |
| 2017/0372165 A1* | 12/2017 | Jouhikainen | H04N 21/23418 |
| 2019/0141410 A1 | 5/2019 | Zverina et al. | |
| 2019/0180108 A1 | 6/2019 | Catalano et al. | |
| 2019/0198057 A1 | 6/2019 | Cheung et al. | |
| 2021/0011960 A1* | 1/2021 | Chambon-Cartier | ........................ G06V 10/25 |
| 2021/0321166 A1 | 10/2021 | Jeong et al. | |
| 2021/0366021 A1* | 11/2021 | Deuskar | G06Q 30/0631 |
| 2021/0383579 A1* | 12/2021 | Lam | G06V 10/764 |
| 2022/0318555 A1 | 10/2022 | Ben-Ari et al. | |
| 2022/0377403 A1 | 11/2022 | Lu et al. | |

* cited by examiner

SYSTEMS AND METHODS FOR CUSTOMIZING LIVE VIDEO STREAMS

TECHNICAL FIELD

The present disclosure relates to media streaming technologies and, in particular, to systems and methods for providing customized streams for audiences of live video streams.

BACKGROUND

Livestreaming is a popular form of broadcasting content to online audiences. A wide variety of content, such as social media, interactive gameplay, and coverage of sporting events, may be recorded and broadcast using a livestream service. Conventional livestreaming systems distribute content to viewers in a one-to-many model—a broadcaster creates a single stream of media content that is transmitted to multiple viewers. While this model allows delivering information in real-time to large audiences, it typically limits customizability of content for individual viewers.

BRIEF DESCRIPTION OF THE DRAWINGS

Embodiments will be described, by way of example only, with reference to the accompanying figures wherein.

DETAILED DESCRIPTION

Figure 1:
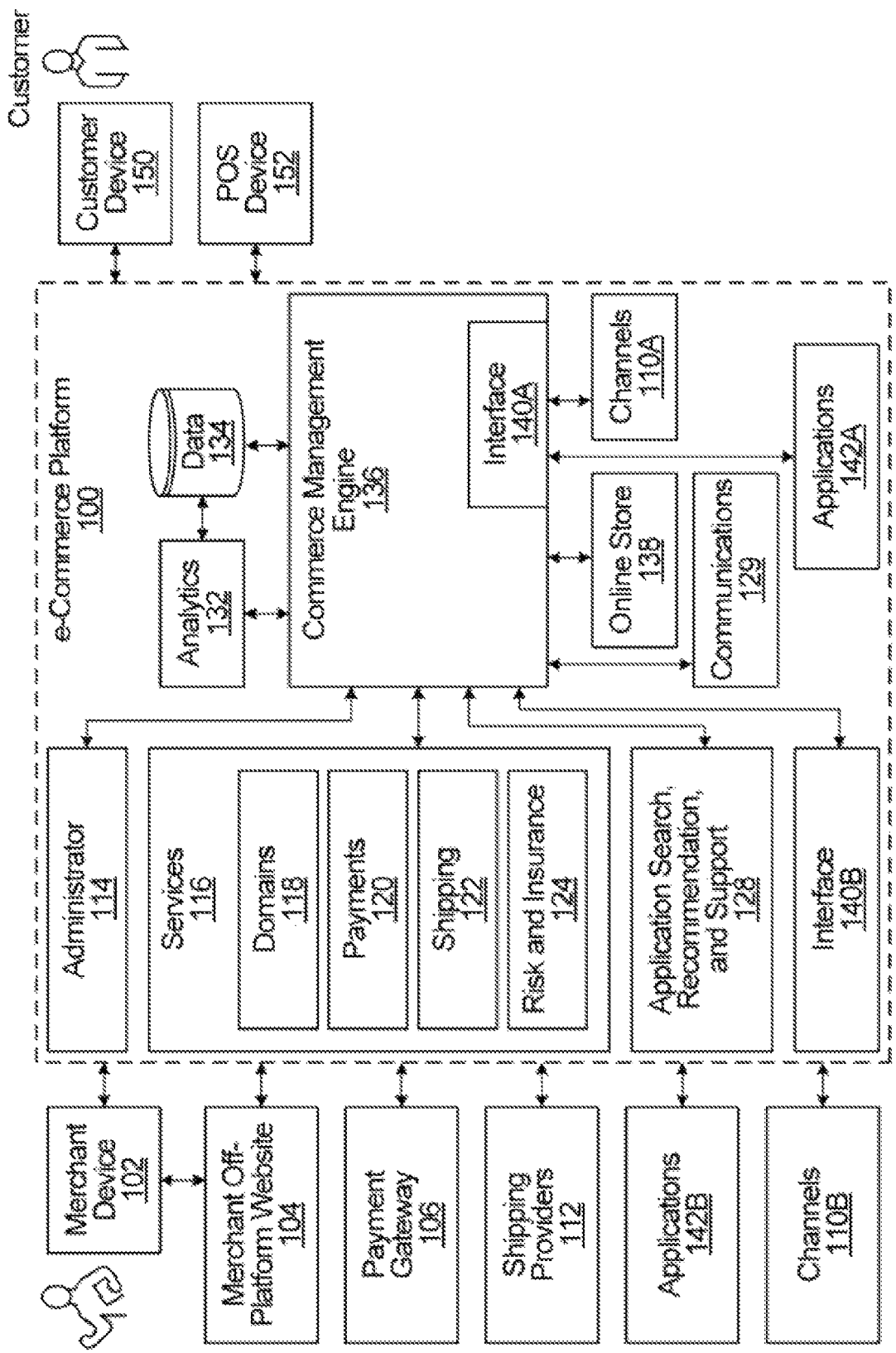
FIG. 1 is a block diagram of an e-commerce platform, according to an example embodiment.

In an aspect, the present application discloses a computer-implemented method. The method includes: receiving video data for a live video stream; identifying a product that is displayed in a video frame of the live video stream; obtaining identifying information for a viewer of the live video stream; determining a product variant preference for the viewer; obtaining a graphical representation of the product variant; and providing modified video data of the live video stream based on presenting the graphical representation of the product variant as overlay content for the live video stream.

In some implementations, obtaining the graphical representation of the product variant may include obtaining three-dimensional representation data for the product variant.

In some implementations, obtaining the graphical representation of the product variant may include: obtaining an image of the product from the video frame; and modifying one or more attributes of the image to obtain the graphical representation of the product variant.

In some implementations, modifying the one or more attributes of the image may include modifying a color of at least one pixel of the image to obtain a recolored image.

In some implementations, the method may further include obtaining commerce data associated with the identifying information for the viewer, wherein the product variant preference for the viewer is determined based on the commerce data.

In some implementations, obtaining the commerce data may include obtaining product preference data of an e-commerce account associated with the viewer.

In some implementations, the product preference data may include at least one of: cart content data for one or more virtual shopping carts associated with the viewer's e-commerce account; wish list data associated with the viewer's e-commerce account; or historical transaction events data associated with the viewer's e-commerce account.

In some implementations, the commerce data may be obtained via a merchant computing system storing e-commerce account data for the viewer.

In some implementations, obtaining the graphical representation of the product variant may include determining scene lighting data for a scene depicted in the video frame, and the graphical representation of the product variant may combine image data for the product variant with the scene lighting data.

In some implementations, providing the modified video data may include: detecting a boundary associated with the product within the video frame; and overlaying the graphical representation of the product variant over at least a portion of the detected boundary to generate a composite video frame.

In some implementations, providing the modified video data may include: detecting visual markers that are affixed to the product in a scene depicted in the video frame; and overlaying the graphical representation of the product variant over a region of the video frame represented by the detected visual markers.

In some implementations, at least some overlay content for the live video stream may be generated at a server and providing the modified video data of the live video stream may include transmitting overlay content that is generated at the server to a device associated with a viewer.

In another aspect, the present application discloses a computing system. The computing system includes a processor and a memory storing computer-executable instructions that, when executed, are to cause the processor to: receive video data for a live video stream; identify a product that is displayed in a video frame of the live video stream; obtain identifying information for a viewer of the live video stream; determine a product variant preference for the viewer; obtain a graphical representation of the product variant; and provide modified video data of the live video stream based on presenting the graphical representation of the product variant as overlay content for the live video stream.

In yet another aspect, the present application discloses a non-transitory, computer-readable medium storing computer-executable instructions that, when executed by a processor, are to cause the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "live video stream" refers to digitally encoded data that is used to transmit a live video from a broadcaster device. More generally, a live video stream comprises a transmission of encoded video data from one computing device to another (or multiple other) computing devices. Typically, a live video stream is provided by means of a one-way broadcast of video data via a content delivery network. For example, a server computing system may receive a live video stream from a broadcaster device (or some source media) and transmit the live video stream to one or more viewer devices for presentation thereon. As used in the present application, the term "streaming media" is intended to cover audio, video, and other media such as live closed captioning, ticker tape, and real-time text, which may all be considered "streaming text".

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Example E-Commerce Platform

In some embodiments, the methods disclosed herein may be performed on or in association with an e-commerce platform. An example of an e-commerce platform will now be described.

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network 420 connected to the e-commerce platform 100. For example, the online store 138 may serve or send content in response to requests for data 134 from the customer device 150, where a browser (or other application) connects to the online store 138 through a network 420 using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
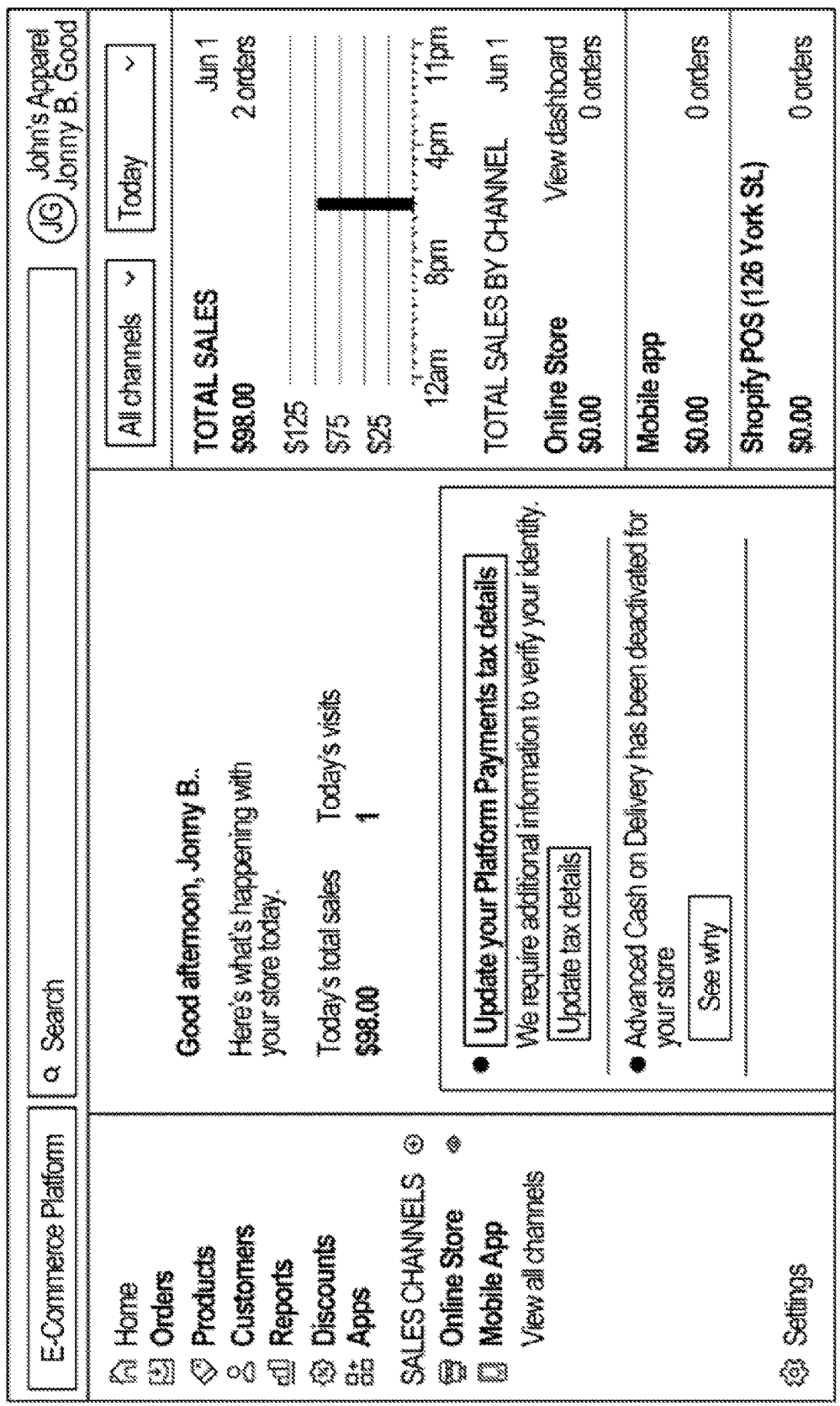
FIG. 2 is an example of a home page of an administrator, according to an example embodiment.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant).

Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

E-Commerce Platforms and Video Streaming

Livestreaming is a popular form of distributing media content to large audiences. A wide variety of content, such as social media, interactive gameplay, and news coverage, may be recorded and broadcast using a livestream service. Other examples of live streams include scheduled events such as concerts, sporting events, and product promotions. A live stream may be initiated by a broadcaster, either spontaneously or in accordance with a defined schedule. (The terms "broadcaster", "streamer", "stream creator" and "host" are used interchangeably in this disclosure to refer to an entity that broadcasts content via a live media stream.) Livestreaming comprises a one-way broadcast of content and generally requires source media (e.g., video camera, audio interface, etc.), encoders to digitize the content, a media publisher entity, and a content delivery network for distributing the content to viewers.

Various platforms that support live streaming services enable interaction by viewers of the live streams. In particular, viewers may be enabled to interact with the broadcaster and/or other viewers of a live stream. For example, a live streaming platform may provide a user interface for a chat room in which one or more viewers of a live stream can participate. Viewers may communicate with each other or the broadcaster by inputting comments, emojis, etc. during a live stream. Viewers may also indicate their reactions to the content of a live stream by, for example, selecting one or more user interface elements (e.g., emotive icons) corresponding to their emotional responses in relation to the streamed content.

In conventional livestreaming systems, a single stream of media content (e.g., audio, video, etc.) is transmitted to multiple viewers. While this format is effective for delivering content in real-time (or substantially real-time) to large audiences, it is generally not conducive to providing customized content for individual viewers. The customization of streamed media may be particularly relevant for live streams that feature information that may be of personal interest to the viewers. For example, a live video stream featuring a product for sale may be of interest for viewers who may be prospective purchasers of the product. In order to provide personalized streams for viewers, a broadcaster may be required to produce multiple recordings or streams of content featuring the product. This may often be a computationally and time intensive undertaking, and may require several takes of the same scene to generate sufficient quantity of digital assets for distribution to individual viewers. Such livestreaming systems may thus be limited in their capacity to deliver customized content in a timely and resource efficient manner.

The present application discloses solutions for addressing some of the aforementioned technical limitations of conventional livestreaming systems. More particularly, the proposed system and methods enable effective customization of live video streams for individual viewers. Live streams may be customized to include viewer-relevant information as part of the streamed media content. In the context of e-commerce, the proposed system may facilitate delivery of viewer-specific product information via live streams. A broadcaster can produce a single stream (or "original" stream) featuring a product of interest, and the original stream may be automatically processed by the system to generate customized streams, i.e., customized versions of the original stream, that are delivered to the respective viewers. The customized streams may present, for each viewer, a preferred variant of the product featured in the original stream, and the content of the customized streams may otherwise be identical to the original stream. Viewers of the live stream may also benefit from being presented with personalized content without having to independently conduct research outside of the live stream. In particular, viewers may proceed directly from consumption of live stream content to an order process for purchasing the featured product.

The proposed system integrates live video streams with an e-commerce platform, and provides customized stream content based on account data associated with viewers of live streams. The system processes video data for a live video stream and identifies a featured product. For each viewer of the live video stream, the system determines a product variant preference for the viewer. The product variant information for the viewers may be determined based on commerce data that is associated with the e-commerce accounts of the viewers. That is, the system may leverage available e-commerce account data for one or more of the viewers of a live video stream in order to determine product variant information. In order to customize the original stream for each viewer, the system obtains a graphical representation of the product variant and provides modified video data of the live video stream based on presenting the graphical representation as overlay content for the original stream.

Figure 3:
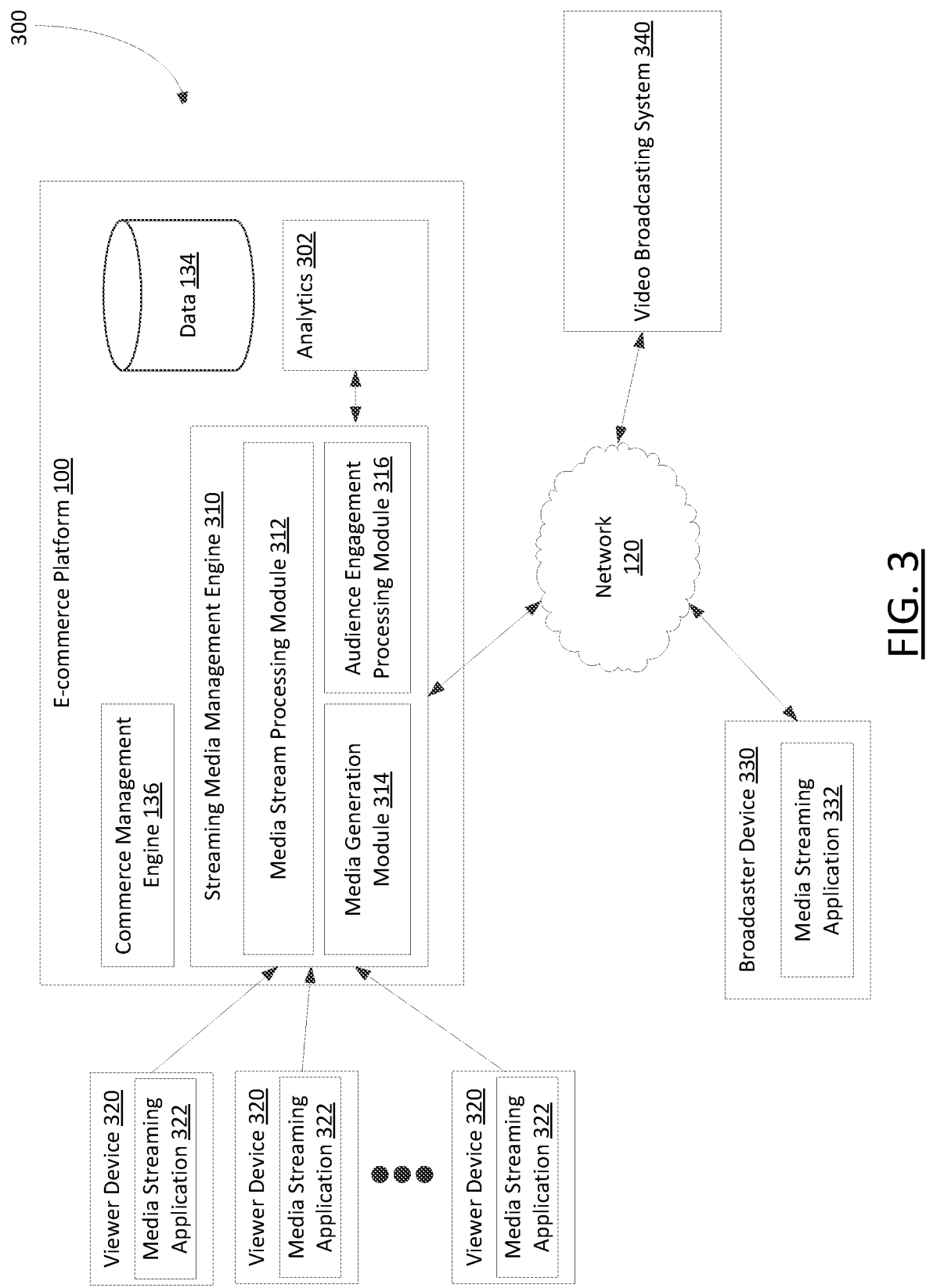
FIG. 3 illustrates a computer network including a video broadcasting service and the e-commerce platform of FIG. 1.

Reference is now made to FIG. 3, which illustrates an exemplary computing environment 300 consistent with certain disclosed embodiments. As shown in FIG. 3, the computing environment 300 may include the e-commerce platform 100, viewer devices 320, broadcaster device 330, a video broadcasting system 340, and a communications network 125 connecting one or more of the components of computing environment 300.

As illustrated, the viewer devices 320 and the broadcaster device 330 communicate via the network 125. In at least some embodiments, each of the viewer devices 320 and the broadcaster device 330 may be a computing device. The viewer devices 320 and the broadcaster device 330 may take a variety of forms including, for example, a mobile communication device such as a smartphone, a tablet computer, a wearable computer (such as a head-mounted display or smartwatch), a laptop or desktop computer, or a computing device of another type.

The broadcaster device 330 is associated with a broadcaster. In particular, the broadcaster device 330 enables a broadcaster to initiate streaming of media content to one or more viewers. In at least some embodiments, the broadcaster device 330 may have resident thereon a media streaming application 332. The media streaming application 332 may be a standalone application (e.g., a mobile app) or a web-based application. A broadcaster can launch the media streaming application 332 on the broadcaster device 330 and initiate a live media (e.g., audio, video, etc.) stream. The live video stream may be transmitted directly to viewer devices 320. Alternatively, the live video stream may be transmitted to an intermediary video broadcasting system 340. In some embodiments, the video broadcasting system 340 may be a social networking system, and the media streaming application 332 may be a social networking application for gaining access to a social network. The broadcaster device 330 may communicate with servers of the video broadcasting system 340 via the media streaming application 332. The video broadcasting system 340 may, in turn, transmit the live video stream to viewer devices 320. The media streaming application 332 may include various monitoring and management functionalities involved in producing a live video stream. By way of example, the broadcaster may control transmission settings for a live video stream, manage viewer permissions, and monitor audience reactions using the media streaming application 332.

The viewer devices 320 are associated with viewers of a live video stream. Viewers may access a live video stream using a media streaming application 322, which may be standalone application or a web-based application. For example, live video streams may be viewed using a web browser, a social networking application, a media playback application, or the like. Viewer devices 320 may communicate directly with the broadcaster device 330, or they may communicate with servers of a video broadcasting system 340.

The viewer devices 320 and/or the broadcaster device 330 may be communicably connected to the e-commerce platform 100. In at least some embodiments, the viewer devices 320 and the broadcaster device 330 may be associated with accounts of the e-commerce platform 100. More specifically, the viewer devices 320 and the broadcaster device 330 may be associated with entities (e.g., individuals) that have accounts in connection with the e-commerce platform 100. For example, one or more viewer devices 320 and broadcaster devices 330 may be associated with customers (e.g., customers having e-commerce accounts) or merchants having one or more online stores in the e-commerce platform 100. The e-commerce platform 100 may store indications of associations between viewer/broadcaster devices and merchants or customers of the e-commerce platform, for example, in the data facility 134.

The video broadcasting system 340 provides a platform for sharing content by means of streams of video data, including live video streams. The video broadcasting system 340 may comprise servers that are configured to receive and transmit live media streams. In at least some embodiments, the video broadcasting system 340 may be a social networking system. In particular, the video broadcasting system 340 may be a computing system that can host an online social network. Users may access the social network to broadcast content to other users or to view content that is steamed by other users. For example, the video broadcasting system 340 may provide a website or software (e.g., a social media app) that enables users to initiate or view a live video stream. The video broadcasting system 340 receives digitally encoded data representing live video streams from broadcaster devices 330, and viewer devices 320 access servers of the video broadcasting system 340 to receive transmission of the encoded video stream data.

FIG. 3 also illustrates the e-commerce platform 100. In at least some embodiments, the e-commerce platform 100 may provide a processing facility for streaming media. The e-commerce platform 100 may be leveraged in order to provide viewers of live video streams with customized content that is relevant for the viewers. More particularly, components of the e-commerce platform 100 may be configured to provide customized streams containing product variant information that is personalized for individual viewers of a live video stream.

The e-commerce platform 100 includes a commerce management engine 136, a streaming media management engine 310, a data facility 134, and a data store 302 for analytics relating to streaming media. The commerce management engine 136 may be configured to handle various operations in connection with e-commerce accounts that are associated with the e-commerce platform 100. For example, the commerce management engine 136 may be configured to retrieve e-commerce account information for various entities (e.g., merchants, customers, etc.) and historical account data, such as transaction events data, browsing history data, and the like, for selected e-commerce accounts. In particular, the commerce management engine 136 may obtain account information for e-commerce accounts of viewers and/or broadcasters of live video streams that are associated with the e-commerce platform 100. In at least some embodiments, the commerce management engine 136 may determine, for selected viewers of live video streams, preferred product variants and offers of products that may be used to customize live video streams for individual viewers. For example, the commerce management engine 136 may determine discounts, sales, incentives, and the like, to offer to select viewers of a live video stream, based on account information for the e-commerce accounts associated with the viewers. The commerce management engine 136 may, in some embodiments, coordinate with the streaming media management engine 310 to control viewers' access to events, such as discounts, sales, etc. that may be offered as part of customized live video streams. Additionally, the commerce management engine 136 may manage connections between streaming/social network accounts of viewers and their e-commerce accounts.

A streaming media management engine 310 is provided in the e-commerce platform 100 of FIG. 3. The streaming media management engine 310 may be a software-implemented module containing processor-executable instructions that, when executed by one or more processors in the e-commerce platform 100, cause the e-commerce platform 100 to carry out some of the processes and functions described herein. In some embodiments, the streaming media management engine 310 may be provided as a service that is external to the e-commerce platform 100. In particular, the e-commerce platform 100 may engage the streaming media management engine 310 as a service that is independent of the e-commerce platform 100 and which facilitates processing of live video streams for entities that are associated with the e-commerce platform 100. More broadly, in some implementations, the subject matter of the present application may be employed in manners independent of a particular e-commerce platform. For example, it may be that the streaming media management engine 310 is implemented and deployed so as to be independent of any e-commerce platform.

The streaming media management engine 310 is configured to receive audio and video data for live video streams. In particular, the streaming media management engine 310 may be communicably connected to one or more broadcaster devices 330. For example, the broadcaster devices 330 may transmit live video stream data directly to the streaming media management engine 310, or live video stream data may be received at the streaming media management engine 310 via an intermediary system, such as the video broadcasting system 340.

In accordance with one or more disclosed embodiments, the streaming media management engine 310 may facilitate customization of live video streams for individual viewers that are associated with the e-commerce platform 100. For example, the streaming media management engine 310 may transmit modified versions of an original live video stream to viewer devices. That is, the media (e.g., audio, video, etc.) data of the live video stream may be modified by the streaming media management engine 310 prior to transmission to viewers. Additionally, or alternatively, the streaming media management engine 310 may transmit the original stream with instructions on how to modify the stream on the client-side (i.e., at the viewer device) prior to presenting the stream to a viewer. By way of example, the streaming media management engine 310 may be configured to provide personalized overlay content that is transmitted with an original live video stream to viewer devices.

In some embodiments, the streaming media management engine 310 may allow for associating a live video stream with e-commerce accounts that are associated with the e-commerce platform 100. For example, the streaming media management engine 310 may determine that a broadcaster of a live video stream is associated with a merchant of the e-commerce platform 100. The broadcaster may themselves be a merchant (e.g., a gamer selling gameplay-related merchandise, a social media influencer selling branded products, a featured merchant on a live shopping channel, etc.), the broadcaster may specify a merchant for whom content is streamed (e.g., a social media influencer showcasing a product of a merchant sponsor), or a merchant can specify a broadcaster for whom approval is granted to feature their product in a live video stream. The streaming media management engine 310 may associate the live video stream with the merchant. As another example, the streaming media management engine 310 may determine that one or more viewers of a live video stream are associated with customer accounts on the e-commerce platform 100. The streaming media management engine 310 may associate the live video stream with e-commerce accounts of those customers that view the live video stream.

The streaming media management engine 310 includes a media stream processing module 312. The media stream processing module 312 performs operations for processing the media data associated with live streams. The media stream processing module 312 receives live video feed from various sources (e.g., video mixers, broadcaster devices, etc.). The live video feed may be in a compressed or uncompressed format. The media stream processing module 312 may supply the live video feed to a plurality of video encoders that compress the live video feed using one or more codecs (e.g., MPEG-2, H. 264, etc.).

The media stream processing module 312 may perform analysis of the media content associated with a live video feed. In some embodiments, the media stream processing module 312 may perform object detection in the live video stream. In particular, the media stream processing module 312 may implement detection of objects (e.g., persons, physical objects, etc.) and associated features and actions, in real-time, based on analysis of audio and/or video data of the live video stream. For example, the media stream processing module 312 may be configured to detect gestures and uttered keywords of subjects that are featured in a live video stream.

In some embodiments, the media stream processing module 312 may capture segments of audio or video data from the live video stream. By way of example, the media stream processing module 312 may identify significant portions of a live video stream and capture audio and/or video segments that are associated with the identified portions. The segments for capture may be determined based on input from broadcaster and/or viewer devices (e.g., timestamp markers indicating highlights of a live video stream) or based on various defined rules for media capture, some of which will be described in greater detail below.

The streaming media management engine 310 also includes a media generation module 314. The media generation module 314 is configured to generate audio or image/video data as overlay content for a live video stream. For example, the media generation module 314 may generate replacement graphics or audio that may be used to overlay at least a portion of the live video stream. In particular, the overlay content that is generated by the media generation module may be presented with the original stream of a live video stream.

In at least some embodiments, the media generation module 314 cooperates with the commerce management engine 136 in generating overlay content for a live video stream. In particular, the media generation module 314 may obtain, via the commerce management engine 136, e-commerce account data for viewers of a live video stream and generate overlay content based on the account data for providing personalized versions of the live video stream.

The streaming media management engine 310 also includes an audience engagement processing module 316. The audience engagement processing module 316 is configured to collect audience engagement data, which may viewer statistics (e.g., number of viewers, number of units of a featured product added to shopping lists, demographic information of viewers) and audience reactions data (e.g., types, number, timing, and frequency of reactions to content). The audience reactions data may include, for example, analytics relating to emotional reactions of viewers to the content of a live video stream. The emotional reactions may include expressions of viewer responses to the content, such as, for example, "like", "celebrate", "love", "care", "sad", "angry", "curious", and/or the like.

The functionality described herein may be used in commerce to provide improved customer or buyer experiences. The e-commerce platform 100 could implement the functionality for any of a variety of different applications, examples of which are described herein. Although the streaming media management engine 310 of FIG. 3 is illustrated as a distinct component of the e-commerce platform 100, this is only an example. An engine could also or instead be provided by another component residing within or external to the e-commerce platform 100. In some embodiments, either or both of the applications 142A-B may provide an engine that implements the functionality described herein to make it available to customers and/or to merchants. Furthermore, in some embodiments, the commerce management engine 136 may provide that engine. However, the location of the streaming media management engine 310 may be implementation specific. In some implementations, the streaming media management engine 310 may be provided at least in part by an e-commerce platform, either as a core function of the e-commerce platform or as an application or service supported by or communicating with the e-commerce platform. Alternatively, the streaming media management engine 310 may be implemented as a stand-alone service to clients such as a customer device or a merchant device. In addition, at least a portion of such an engine could be implemented in the merchant device and/or in the customer device. For example, a customer device could store and run an engine locally as a software application.

The streaming media management engine 310 is configured to implement at least some of the functionality described herein. Although the embodiments described below may be implemented in association with an e-commerce platform, such as (but not limited to) the e-commerce platform 100, the embodiments described below are not limited to e-commerce platforms.

The data facility 134 may store data collected by the e-commerce platform 100 based on the interaction of merchants and customers with the e-commerce platform 100. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 100, may also be collected and stored in the data facility 134. Such customer data is obtained on the basis of inputs received via customer devices associated with the customers and/or prospective purchasers. By way of example, historical transaction events data including details of purchase transaction events by customers on the e-commerce platform 100 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 100 by merchants and customers (or prospective purchasers) may be collected and stored in the data facility 134.

The data facility 134 may include customer preference data for customers of the e-commerce platform 100. For example, the data facility 134 may store account information, order history, browsing history, and the like, for each customer having an account associated with the e-commerce platform 100. The data facility 134 may additionally store, for a plurality of e-commerce accounts, wish list data and cart content data for one or more virtual shopping carts.

The e-commerce platform 100, the viewer devices 320, the broadcaster device 330, and the video broadcasting system 340 may be in geographically disparate locations. Put differently, the viewer devices 320 may be remote from one or more of: the e-commerce platform 100, the broadcaster device 330, and the video broadcasting system 340. As described above, the viewer devices 320, the broadcaster device 330, the e-commerce platform 100, and the video broadcasting system 340 may be computing systems.

The network 125 is a computer network. In some embodiments, the network 125 may be an internetwork such as may be formed of one or more interconnected computer networks. For example, the network 125 may be or may include an Ethernet network, an asynchronous transfer mode (ATM) network, a wireless network, or the like.

Figure 4:
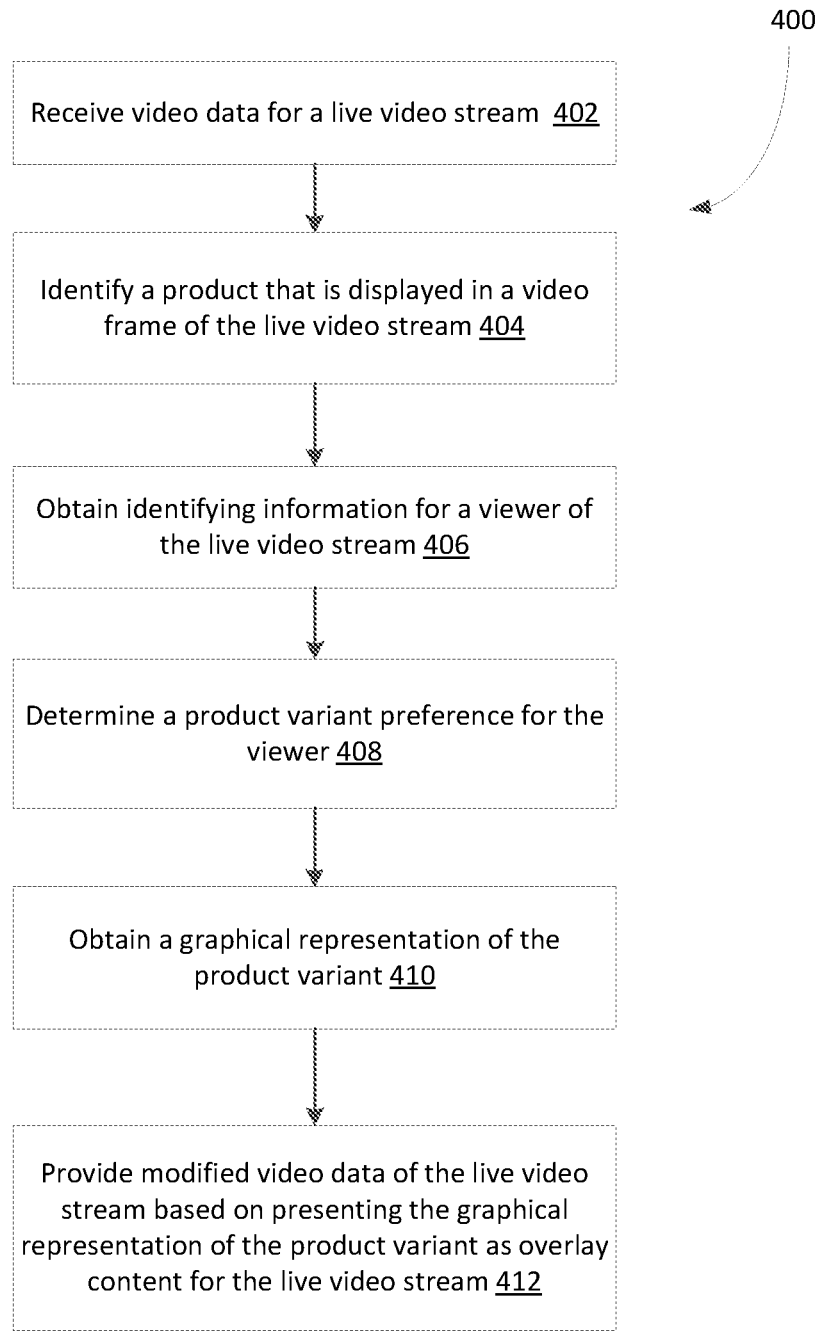
FIG. 4 shows, in flowchart form, an example method for processing a live video stream.

Reference is now made to FIG. 4, which shows, in flowchart form, an example method 400 for processing a live video stream. The method 400 may be performed by a computing system that implements media stream processing, such as the streaming media management engine 310 of FIG. 3. The streaming media management engine may perform the operations of method 400 when generating customized streams of media content for viewers of a live video stream. In accordance with method 400, a streaming media management engine may be enabled to provide viewer-specific product information as part of customized live stream content that is delivered to viewers. As detailed above, the streaming media management engine may be a service that is provided within or external to an e-commerce platform to facilitate, among others, integration of live video streams with e-commerce activity.

In operation 402, the streaming media management engine receives video data for a live video stream. The live video stream may be transmitted by a computing device associated with a broadcaster. In some embodiments, the video data may be transmitted directly from the broadcaster device to the streaming media management engine. Alternatively, the streaming media management engine may receive the video data from a video broadcasting system, such as the servers of an online social network. The live video stream may be broadcast by a user of the social network, and the video data may be transmitted from the social network servers for delivery to viewer devices associated with other users of the social network.

The streaming media management engine receives the video data prior to delivery of the live video stream to viewers. That is, for one or more viewers of a live video stream—i.e., viewers that request to access a live video stream—the streaming media management engine may process the video data of the live video stream prior to delivery of the stream content to the viewers. In particular, the streaming media management engine is configured to receive and process original video data for a live video stream in real-time, and deliver modified video data to the viewers.

In operation 404, the streaming media management engine identifies a product that is displayed in a video frame of the live video stream. In particular, the streaming media management engine identifies a physical product that is present in the live video stream. In some embodiments, the streaming media management engine may receive metadata with the live video stream that indicates specifications (e.g., product dimensions, etc.) of one or more specific products, and the information indicated in the metadata may be used to identify objects corresponding to the products in individual frames of the live video stream. In some embodiments, the streaming media management engine may perform image analysis of video frames associated with the video data to detect objects that are depicted in the live video stream using one or more real-time object detection techniques such as "Faster R-CNN" or "YOLOv3" to detect individual objects in the live video stream. For example, the streaming media management engine may detect a physical object that is displayed in one or more video frames of the video data and determine features of the object to try to identify a particular product. The streaming media management engine may, for example, access catalog data for one or more merchants to determine an identity of the depicted product in the live video stream. In some embodiments, the streaming media management engine may receive input of product information for a product that is featured in the live video stream. For example, the broadcaster (e.g., a merchant, a sponsored streamer, etc.) may provide input of product information, and the streaming media management engine may identify the product in one or more video frames of the video data. The broadcaster may, in some embodiments, designate a target frame region or physical surface depicted within a video frame where the product is desired to be shown in the live video stream.

In operation 406, the streaming media management engine obtains identifying information for a viewer of the live video stream. In particular, the streaming media management engine may determine the identities of all of a subset of viewers of the live video stream. For example, the streaming media management engine may determine unique identifiers associated with viewers. The unique identifiers may be assigned, for example, by a video broadcasting system associated with the live video stream or by the streaming media management engine itself. A unique identifier may be assigned to each new viewer (and/or viewer device) associated with the live video stream. In some embodiments, the identifying information for a viewer may include viewer-provided identifiers such as a name, an email address, and the like.

The streaming media management engine may determine whether there are matches between the identifying information of viewers of the live video stream and entities (e.g., customers, merchants, etc.) that are associated with the e-commerce platform. In some embodiments, the streaming media management engine may detect that a viewer of a live media stream is associated with an e-commerce account of the e-commerce platform. For example, the streaming media management engine may determine that a viewer is associated with a viewer device that is, in turn, associated with an e-commerce account. The streaming media management engine may detect that the viewer is logged in to an e-commerce account, or determine that unique identifying information (e.g., identifier) of a viewer is associated with an e-commerce account. For example, a unique identifier of a viewer or viewer device may be stored in association with an e-commerce account in a database such as data facility 134.

In operation 408, the streaming media management engine determines a product variant preference (e.g., a preferred product variant) for the identified viewer of the live video stream. Product variants are sets of products that are related to one another in terms of attributes such as size, color, etc. In particular, product variants are products that are fundamentally the same (e.g., same design, functionalities, etc.) and that vary only in a limited number of ways which do not alter the essence and nature of the product. For example, product variants may differ only in specific product attributes. A preferred product variant for a viewer may be a version of a product that represents the viewer's product preferences. For example, the preferred product variant may be a version of the product having features that correspond to one or more of the viewer's preferences for product attributes/characteristics.

In at least some embodiments, the streaming media management engine may access one or more e-commerce accounts associated with the identified viewer, and the preferred product variant for the viewer may be determined based on the commerce data associated with the e-commerce accounts. For example, the streaming media management engine may obtain product preference data of an e-commerce account associated with the viewer. The product preference data may be determined based on at least one of: cart content data for one or more virtual shopping carts associated with the viewer's e-commerce account; wish list data associated with the viewer's e-commerce account; or historical transaction events data associated with the viewer's e-commerce account. For example, the streaming media management engine may inspect the known contents of a virtual shopping cart associated with the viewer's e-commerce account to determine product preference information.

A virtual shopping cart may contain items that a customer wishes to purchase. The items may remain in the virtual shopping cart indefinitely or until either a check-out process when the items are purchased or the item is manually removed from the virtual shopping cart. The streaming media management engine may obtain the viewer's virtual shopping cart data and identify items that have been added to the virtual shopping cart by the viewer. The items of the virtual shopping cart and the attributes associated with the items may form the basis of product preference data for the viewer. In particular, the products corresponding to the items of the virtual shopping cart and the attributes of those products may be taken to represent the viewer's product preferences. The preferred products and/or product attributes, as determined based on the contents of the viewer's virtual shopping cart, can then inform the determination of the preferred product variant for the viewer.

In some embodiments, the product attributes of products contained in the viewer's virtual shopping cart may be used to identify the preferred product variant. For example, the streaming media management engine may determine a set of product attributes associated with products of the viewer's virtual shopping cart and identify those of the product attributes that are most commonly found among said products. Such product attributes may be deemed to be a representation of the viewer's product preferences. The preferred product variant may then be determined to be a version of the product that has one or more of preferred product attributes. For example, the preferred product variant may be a version of the product that has a defined number of the most commonly found attributes among the products/items in the viewer's virtual shopping cart.

Additionally, or alternatively, wish lists and/or purchase history associated with the viewer's e-commerce account may be used as a basis for determining the viewer's product preferences. In particular, wish list and/or purchase history data may be used by the streaming media engine to determine the preferred product variant for the viewer. For example, the products selected by the viewer for inclusion in one or more wish lists and attributes associated with those products may inform the determination of product preferences for the viewer. As another example, products that were previously purchased by the viewer and attributes associated with those purchased products may inform the determination of the viewer's product preferences. The product preference data may, in turn, be used by the streaming media management engine to determine the preferred product variant for the viewer. The preferred product variant may be determined in a similar manner as for the example of the virtual shopping cart. In particular, the streaming media management engine may identify most commonly found product attributes among the items in the wish lists and/or purchase history and determine the preferred product variant to be a version of the product having one or more of said product attributes.

In some embodiments, the commerce data may be obtained via a merchant computing system storing e-commerce account data for the viewer. In particular, the commerce data may be provided by a merchant computing system that already has access to information (e.g., historical purchase data, etc.) about the viewer.

In operation 410, the streaming media management engine obtains a graphical representation of the product variant. More specifically, the streaming media management engine may generate a graphical representation of the product in accordance with product attributes as determined by the preferred product variant information for the viewer. The graphical representation may be a graphical data object (e.g., a two- or three-dimensional image file) that can be transmitted with a live video stream or combined with video data of a live video stream.

In some embodiments, the streaming media management engine may obtain image data for the product variant from a data store, such as an image database. For example, an image (e.g., a photo) of the product variant may be retrieved from a database associated with a merchant computing system. The streaming media management engine may query the database to retrieve image data for the product variant. Alternatively, an image of the product may first be retrieved and the retrieved image may be modified to generate an image of the product variant. In particular, the streaming media management engine may modify an image of the product to depict attributes of the product variant and thereby alter the appearance of the product. For example, the image of the product may be overlaid with different colors, patterns, designs, and the like, to obtain an image depicting the preferred product variant.

In some embodiments, the streaming media management engine may obtain image data for the product from video frames of the live video stream. In particular, an image of the product as represented in one or more video frames may be captured, for example, by cropping the image. The captured image may then be manipulated to depict attributes of the product variant and generate an image of the product variant.

In operation 412, the streaming media management engine provides modified video data of the live video stream based on presenting a render of the graphical representation of the product variant as overlay content for the live video stream. That is, the graphical representation of the product is overlaid onto the live video stream. In at least some embodiments, the streaming media management engine generates modified video data that combines the graphical representation of the product variant and the original live video stream feed. For example, the video data for the original live video stream may be modified to overlay the graphical representation of the product variant on at least a portion of the region of the video frame occupied by the detected product in the original live video stream. The modified video data may then be delivered to the viewer device associated with the identified viewer. In particular, a customized live video stream that comprises modified video data containing viewer-specific content, i.e., preference information, is delivered to the viewer.

The overlay content may be updated in real-time or near real-time as the scene depicted in the live video stream changes. For example, when the product is moved in the scene or when a view of the scene is changed (e.g., due to movement of the camera relative to the scene), the overlay content may be updated to ensure that the render of the overlay content matches the size and orientation of the product variant from the perspective of the viewer.

In some embodiments, at least some overlay content for the live video stream may be generated at a server. That is, overlay content, including graphical representation of the product variant, for the live video stream may be generated server-side, i.e., at the e-commerce platform. The streaming media engagement engine may transmit the overlay content to devices associated with viewers. In some embodiments, some overlay content may be generated client-side, or on a viewer device. For example, the streaming media management engine may transmit instructions for how to generate and present a graphical representation of a preferred product variant for the viewer on the viewer's device.

Figure 5:
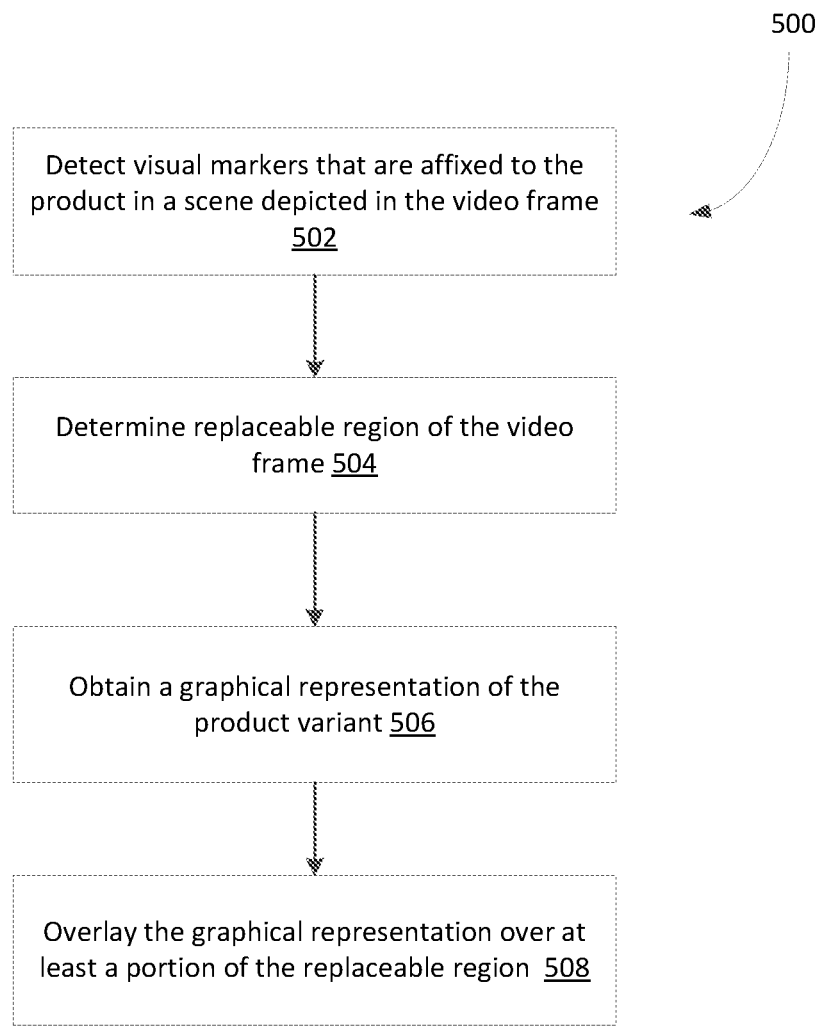
FIG. 5 shows, in flowchart form, an example method for providing modified video data of a customized live video stream.
Figure 6:
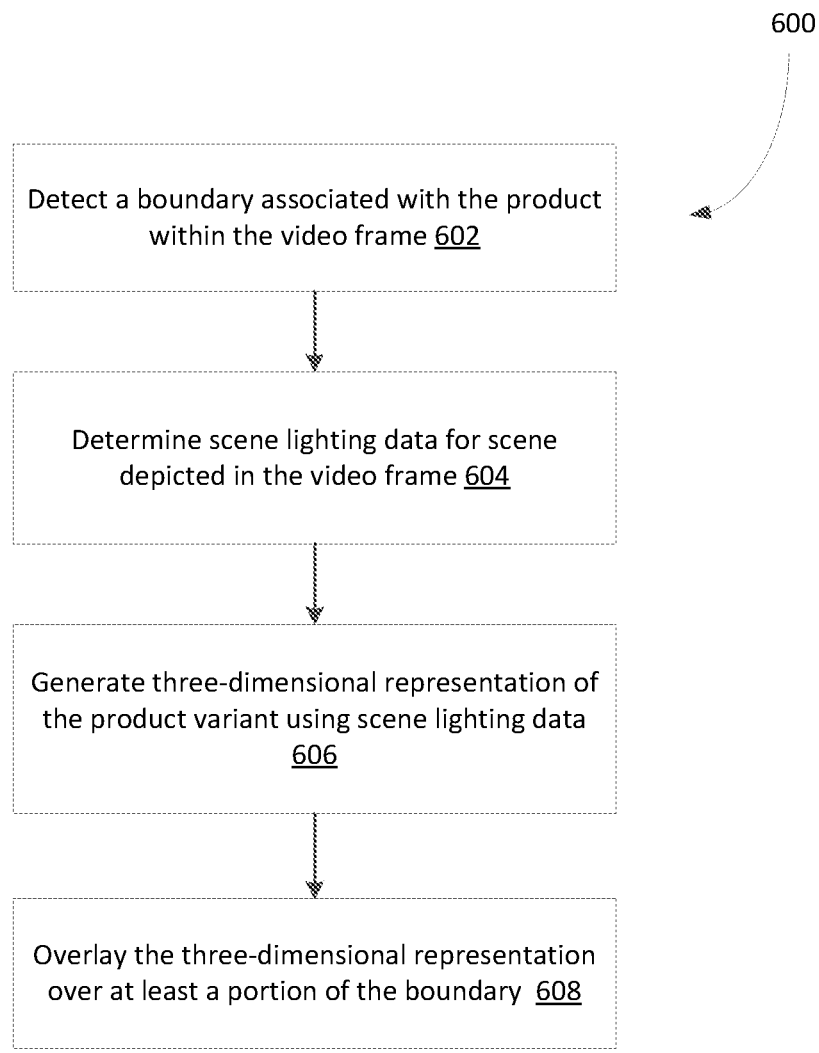
FIG. 6 shows, in flowchart form, another example method for providing modified video data of a customized live video stream.
Figure 7:
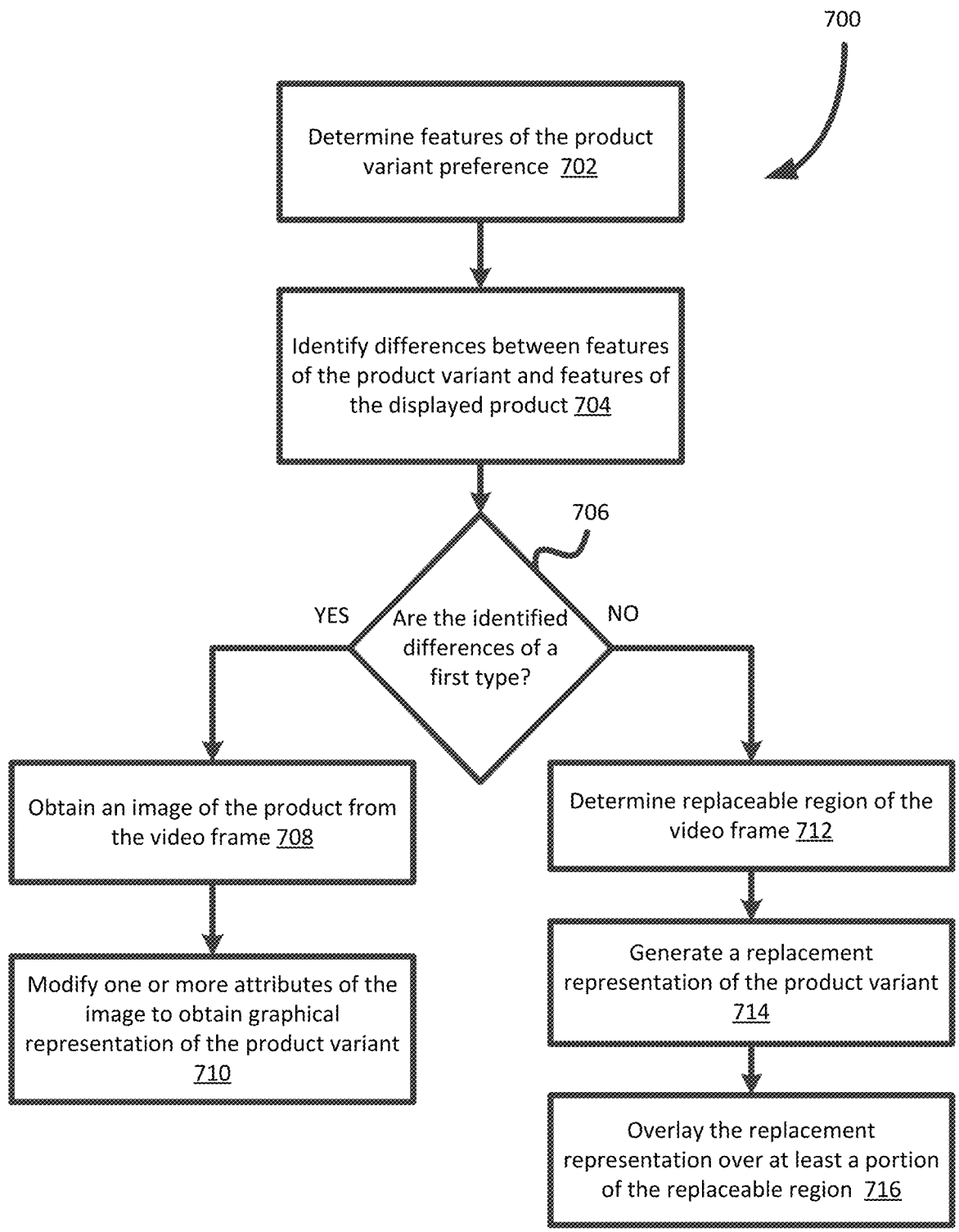
FIG. 7 shows, in flowchart form, another example method for providing modified video data of a customized live video stream.

FIGS. 5 to 7 will describe in greater detail different techniques for presenting preferred product variant information for a viewer of a live video stream. Reference is made to FIG. 5, which shows, in flowchart form, an example method 500 for providing modified video data of a customized live video stream. The method 500 may be performed by a computing system implementing a streaming media management engine. The streaming media management engine may perform the operations of method 500 when generating customized streams of media content for viewers of a live video stream. In accordance with method 500, a streaming media management engine may be enabled to provide viewer-specific product information as part of customized stream content that is delivered to viewers. As detailed above, the streaming media management engine may be a service that is provided within or external to an e-commerce platform to facilitate, among others, integration of live video streams with e-commerce activity. The operations of method 500 may be performed in addition to, or as alternatives of, one or more of the operations of method 400 of FIG. 4.

In operation 502, the streaming media management engine detects visual markers (or indicators) associated with a product that is displayed in a scene depicted in a video frame. The visual markers may be detected based on image analysis of the depicted scene. The visual markers may, for example, be affixed directly to the product. In some embodiments, the visual markers may encode data representing product information for the product. For example, one or more visual markers containing machine-readable labels/indicia (e.g., barcodes such as, for example, a QR code) may encode information about the featured product, such as type, brand, model, design, shape, color, patterns, size, manufacturer, and stock availability. The visual markers may be detected based on image analysis of the depicted scene in the video frame.

In operation 504, the streaming media management engine determines a replaceable region of the video frame. In some embodiments, a plurality of visual markers may be placed on the product such that the visual markers can be used to determine a demarcation of a boundary (i.e., replaceable region) of the video frame. For example, markers may be strategically positioned on the surface of the product to identify end, or extreme, positions.

In operation 506, the streaming media management engine obtains a graphical representation of the product variant. The graphical representation may, for example, be a two-dimensional image or a three-dimensional representation of the product variant. In operation 508, the streaming media management engine overlays the graphical representation over at least a portion of the replaceable region. In some embodiments, the visual markers associated with the product may be used to determine how to overlay the graphical representation of the product variant in the video data. For example, the streaming media management engine may attempt to map similar positions on the graphical representation of the product variant to the positions indicated by the visual markers on the product in the original live video stream, and overlay the graphical representation in accordance with the mapping.

It will be understood that the overlaying of product variant content may be performed for each video frame of the live video stream in which the product is detected. That is, the streaming media management engine may continuously modify video data, in real-time, to present preferred product variant information for the viewer in place of the product featured in the original live video stream.

Reference is now made to FIG. 6, which shows, in flowchart form, another example method 600 for providing modified video data of a customized live video stream. The method 600 may be performed by a computing system implementing a streaming media management engine. The streaming media management engine may perform the operations of method 600 when generating customized streams of media content for viewers of a live video stream. In accordance with method 600, a streaming media management engine may be enabled to provide viewer-specific product information as part of customized stream content that is delivered to viewers. The operations of method 600 may be performed in addition to, or as alternatives of, one or more of the operations of method 400 of FIG. 4

In operation 602, the streaming media management engine detects a boundary associated with the product within a video frame. The boundary may represent a replaceable region in the video frame that is occupied by a detected product in the original live video stream. The streaming media management engine may implement one or more object detection techniques for detecting the product in the video frame, and determine a boundary that surrounds the detected product.

In operation 604, the streaming media management engine determines scene lighting data for a scene that is depicted in the video frame. The graphical representation of the product variant combines image data for the product variant with the scene lighting data. In at least some embodiments, the scene lighting data may comprise ambient light data identifying positions of light sources for the scene depicted in the video frame and a relative position of a camera (or video capture apparatus) that is used in producing the live video stream.

In operation 606, the streaming media management engine generates a three-dimensional representation of the product variant using the scene lighting data, and overlays the three-dimensional representation over at least a portion of the boundary, in operation 608

Similar to method 500, it will be understood that the overlaying of product variant content in method 600 may be performed for each video frame of the live video stream in which the product is detected. In particular, the streaming media management engine may continuously modify video data, in real-time, to present preferred product variant information for the viewer in place of the product featured in the original live video stream.

Reference is now made to FIG. 7, which shows, in flowchart form, another example method 700 for providing modified video data of a customized live video stream. The method 700 may be performed by a computing system implementing a streaming media management engine. The streaming media management engine may perform the operations of method 700 when generating customized streams of media content for viewers of a live video stream. In accordance with method 700, a streaming media management engine may be enabled to provide viewer-specific product information as part of customized stream content that is delivered to viewers. The operations of method 700 may be performed in addition to, or as alternatives of, one or more of the operations of method 400 of FIG. 4

In operation 702, the streaming media management engine determines features of the product variant preference for a viewer of a live video stream. That is, the streaming media management engine determines one or more product features for a preferred product variant for the viewer. The product features may be any one or more of: type, brand, model, design, shape, color, size, manufacturer, and stock availability.

In operation 704, the streaming media management engine identifies differences between features of the product variant and features of the displayed product. In particular, the streaming media management engine determines those product features that are different for the preferred product variant for the viewer and the product, as depicted, in the original live video stream.

In operation 706, the streaming media management engine determines whether the identified differences are of a first type. In some embodiments, a difference in product features may be determined to be of a first type if the difference relates to a feature that belongs to a defined set of features. The defined set may, for example, include features for which a change in a graphical representation may be obtained without having to redraw the entirety of the product in the video data. By way of example, if the only difference between a preferred product variant and the originally depicted product is color, it may be computationally more efficient to simply recolor pixels associated with the image (two- or three-dimensional) of the product to obtain the graphical representation of the product variant, rather than having to generate a new image of, or redraw, the entire product.

If the identified differences are determined to be of a first type, the streaming media management engine obtains an image of the product from the video frame, in operation 708. The streaming media management engine then modifies one or more attributes of the image to obtain a graphical representation of the product variant, in operation 710. In some embodiments, modifying the one or more attributes of the image may include modifying a color of at least one pixel of the image to obtain a recolored image. For example, if the preferred product variant for the viewer has a different color than the originally depicted product, the streaming media management engine may recolor pixels associated with the obtained image of the product.

If, on the other hand, the streaming media management engine determines that the identified differences are not of the first type, the streaming media management engine determines a replaceable region of a video frame, in operation 712. The streaming media management engine then generates a replacement representation of the product variant in operation 714, and overlays the replacement representation over at least a portion of the replaceable region in operation 716. Operations 712 to 716 may be performed in a similar manner as described above with reference to methods 500 and 600.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving video data for a live video stream;
identifying a product that is displayed in a video frame of the live video stream;
obtaining identifying information for a viewer of the live video stream;
determining a product variant representing a preferred version of the identified product for the viewer based on:
identifying products that have been added to a virtual shopping cart associated with an e-commerce account by the viewer;
determining preferred product attributes of the products that have been added to the virtual shopping cart; and
determining a version of the identified product that has at least a threshold number of the preferred product attributes;
obtaining a graphical representation of the determined product variant; and
providing modified video data of the live video stream in real-time based on, for each of a plurality of video frames of the live stream in which the product is detected:
determining a boundary surrounding the identified product within the video frame; and
overlaying a region bounded by the boundary in the video frame with the graphical representation of the determined product variant to replace the identified product with the determined product variant.

2. The method of claim 1, wherein obtaining the graphical representation of the determined product variant comprises obtaining three-dimensional representation data for the product variant.

3. The method of claim 1, wherein obtaining the graphical representation of the determined product variant comprises:
obtaining an image of the product from the video frame; and
modifying one or more attributes of the image to obtain the graphical representation of the product variant.

4. The method of claim 3, wherein modifying the one or more attributes of the image comprises modifying a color of at least one pixel of the image to obtain a recolored image.

5. The method of claim 1, further comprising obtaining commerce data associated with the identifying information for the viewer, wherein the product variant preference for the viewer is determined based on the commerce data.

6. The method of claim 5, wherein the commerce data is obtained via a merchant computing system storing e-commerce account data for the viewer.

7. The method of claim 1, wherein obtaining the graphical representation of the determined product variant comprises:
determining scene lighting data for a scene depicted in the video frame,
wherein the graphical representation of the determined product variant combines image data for the product variant with the scene lighting data.

8. The method of claim 1, wherein providing the modified video data comprises:
detecting visual markers that are affixed to the product in a scene depicted in the video frame; and
overlaying the graphical representation of the determined product variant over a region of the video frame represented by the detected visual markers.

9. The method of claim 1, wherein at least some overlay content for the live video stream is generated at a server and wherein providing the modified video data of the live video stream comprises transmitting overlay content that is generated at the server to a device associated with a viewer.

10. A computing system, comprising:
a processor;
a memory storing computer-executable instructions that, when executed by the processor, are to cause the processor to:
receive video data for a live video stream;
identify a product that is displayed in a video frame of the live video stream;
obtain identifying information for a viewer of the live video stream;
determine a product variant representing a preferred version of the identified product for the viewer based on:
identifying products that have been added to a virtual shopping cart associated with an e-commerce account by the viewer;
determining preferred product attributes of the products that have been added to the virtual shopping cart; and
determining a version of the identified product that has at least a threshold number of the preferred product attributes;
obtain a graphical representation of the determined product variant; and
provide modified video data of the live video stream in real-time based on, for each of a plurality of video frames of the live stream in which the product is detected:
determining a boundary surrounding the identified product within the video frame; and
overlaying a region bounded by the boundary in the video frame with the graphical representation of the determined product variant to replace the identified product with the determined product variant.

11. The computing system of claim 10, wherein obtaining the graphical representation of the determined product variant comprises obtaining three-dimensional representation data for the product variant.

12. The computing system of claim 10, wherein obtaining the graphical representation of the determined product variant comprises:
    obtaining an image of the product from the video frame; and
    modifying one or more attributes of the image to obtain the graphical representation of the product variant.

13. The computing system of claim 12, wherein modifying the one or more attributes of the image comprises modifying a color of at least one pixel of the image to obtain a recolored image.

14. The computing system of claim 10, wherein the instructions, when executed, are to further cause the processor to obtain commerce data associated with the identifying information for the viewer, wherein the product variant preference for the viewer is determined based on the commerce data.

15. A non-transitory computer-readable medium storing computer-executable instructions that, when executed by a processor, are to cause the processor to:
    receive video data for a live video stream;
    identify a product that is displayed in a video frame of the live video stream;
    obtain identifying information for a viewer of the live video stream;
    determine a product variant representing a preferred version of the identified product for the viewer based on:
        identifying products that have been added to a virtual shopping cart associated with an e-commerce account by the viewer;
        determining preferred product attributes of the products that have been added to the virtual shopping cart; and
        determining a version of the identified product that has at least a threshold number of the preferred product attributes;
    obtain a graphical representation of the determined product variant; and
    provide modified video data of the live video stream in real-time based on, for each of a plurality of video frames of the live stream in which the product is detected:
        determining a boundary surrounding the identified product within the video frame; and
        overlaying a region bounded by the boundary in the video frame with the graphical representation of the determined product variant to replace the identified product with the determined product variant.

16. The computing system of claim 10, wherein obtaining the graphical representation of the determined product variant comprises:
    determining scene lighting data for a scene depicted in the video frame,
    wherein the graphical representation of the product variant combines image data for the product variant with the scene lighting data.

17. The computing system of claim 10, wherein providing the modified video data comprises:
    detecting a boundary associated with the product within the video frame; and
    overlaying the graphical representation of the product variant over at least a portion of the detected boundary to generate a composite video frame.

18. The method of claim 1, wherein the determining the product variant comprises identifying product attributes of products contained in the one or more virtual shopping carts, and wherein the product variant is determined based on the identified product attributes.

19. The method of claim 18, wherein identifying the product attributes comprises identifying attributes that are most commonly found among the products contained in the one or more virtual shopping carts.

20. The method of claim 19, wherein the product variant is a version of the product that has a defined number of the most commonly found attributes.

* * * * *